US012727019B2

(12) United States Patent
Yang et al.

(10) Patent No.: US 12,727,019 B2
(45) Date of Patent: Sep. 1, 2026

(54) SYSTEMS AND METHODS FOR TRACKING QUALITY OF EXPERIENCE USING RATE VARIATION

(71) Applicant: Verizon Patent and Licensing inc., Basking Ridge, NJ (US)

(72) Inventors: Jin Yang, Orinda, CA (US); John J. Cooke, Algonquin, IL (US); Susan Wu Sanders, Bridgewater, NJ (US); Arvind Kumar, Suwanee, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 344 days.

(21) Appl. No.: 18/351,999

(22) Filed: Jul. 13, 2023

(65) Prior Publication Data

US 2025/0024485 A1 Jan. 16, 2025

(51) Int. Cl.
*H04W 72/543* (2023.01)
*H04W 72/12* (2023.01)

(52) U.S. Cl.
CPC ......... *H04W 72/543* (2023.01); *H04W 72/12* (2013.01)

(58) Field of Classification Search
CPC .... H04W 72/12; H04W 72/543; H04W 72/54
See application file for complete search history.

(56) References Cited

U.S. PATENT DOCUMENTS

| | | | | |
|---|---|---|---|---|
| 12,160,769 | B2 * | 12/2024 | Gangakhedkar .. | H04M 15/8033 |
| 2010/0056131 | A1 * | 3/2010 | Kelif .................. | H04W 72/542 455/422.1 |
| 2011/0158110 | A1 * | 6/2011 | Stacey ................. | H04W 48/08 370/252 |
| 2014/0016464 | A1 * | 1/2014 | Shirazipour ........... | H04L 47/26 370/235 |
| 2015/0189644 | A1 * | 7/2015 | Lorca Hernando ... | H04L 5/0055 370/329 |
| 2017/0054776 | A1 * | 2/2017 | Dao ...................... | H04L 65/752 |
| 2017/0332282 | A1 * | 11/2017 | Dao ...................... | H04L 1/0002 |
| 2020/0112907 | A1 * | 4/2020 | Dao ................. | H04M 15/8016 |
| 2021/0314238 | A1 * | 10/2021 | Cioffi ................. | H04L 41/5067 |
| 2024/0323750 | A1 * | 9/2024 | Zhang .................. | H04W 24/10 |

* cited by examiner

*Primary Examiner* — Margaret G Webb

(57) ABSTRACT

In some implementations, a distributed unit (DU) associated with a network node may determine a rate variation associated with one or more of a quality of service (QoS) flow or a network slice. The DU may perform a scheduling for a user equipment (UE) based on the rate variation, wherein the scheduling is associated with an adjusted data rate based on the rate variation.

20 Claims, 5 Drawing Sheets

500

SYSTEMS AND METHODS FOR TRACKING QUALITY OF EXPERIENCE USING RATE VARIATION

BACKGROUND

Wireless communication systems are widely deployed to provide various telecommunication services such as telephony, video, data, messaging, and broadcasts. A wireless network may include one or more network nodes that support communication for wireless communication devices, such as a user equipment (UE). A UE may communicate with a network node via downlink communications and uplink communications.

DETAILED DESCRIPTION OF EXAMPLE EMBODIMENTS

Figure 1:
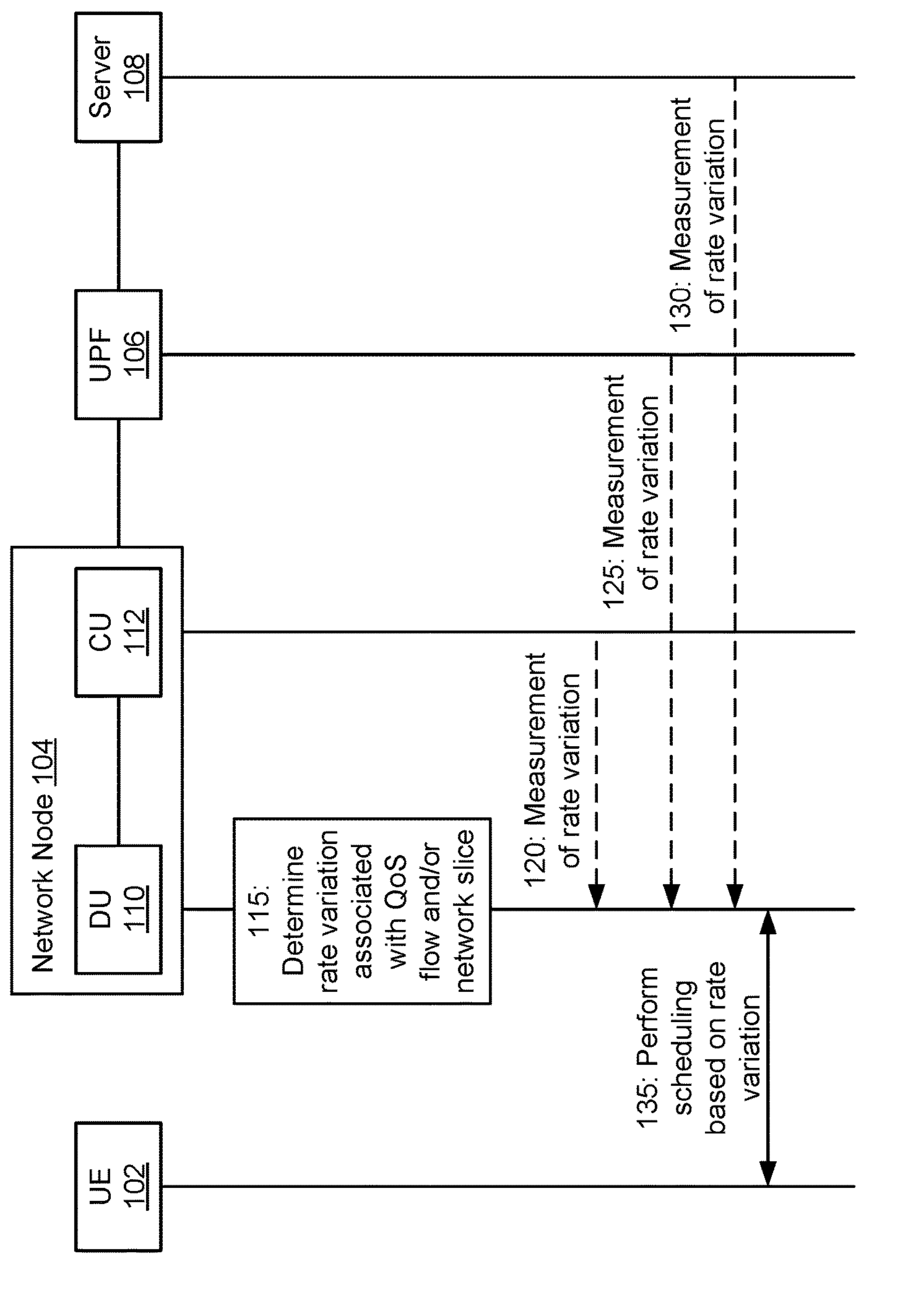
FIG. 1 is a diagram of an example associated with tracking quality of experience (QoE) using rate variation.

The following detailed description of example implementations refers to the accompanying drawings. The same reference numbers in different drawings may identify the same or similar elements.

In a wireless network, a network performance may depend on latency, jitter, and/or reliability associated with the wireless network. Latency may be associated with an amount of time taken for data to reach a particular designation. Jitter may be associated with a change in an amount of latency. Reliability may be associated with a likelihood that a data packet will be successfully received by a recipient via the wireless network, or a likelihood that the data packet will be dropped and not successfully received by the recipient. Some applications may be especially sensitive to latency, jitter, and/or reliability. A quality of experience (QoE) may depend on latency, jitter, and/or reliability. For example, relatively high latency may degrade the QoE, relatively high jitter may degrade the QoE, and/or relatively low reliability may negatively impact data rates, thereby degrading the QoE.

Latency, jitter, and/or reliability may be relatively challenging to measure at a radio level. A counter for compensation may attempt to measure latency, jitter, and/or reliability, and then compensate for the latency, the jitter, and/or the reliability. However, such an approach may not accurately capture the latency, the jitter, and/or the reliability. For example, uplink latency may need to be measured end-to-end (E2E), which may not be possible when using the counter for compensation. Without a sufficient mechanism to measure latency, jitter, and/or reliability in the wireless network, issues in the wireless network may not be sufficiently detected and resolved, thereby degrading the QoE.

In some implementations, a rate variation (or data rate variation) may be used to track a QoE associated with a wireless network. A network node (e.g., a distributed unit (DU) associated with the network node) may determine the rate variation associated with a quality of service (QoS) flow and/or a network slice. The rate variation may be associated with a QoE. The network node may receive, from a packet data convergence protocol (PDCP) layer of a centralized unit (CU) associated with the network node, a measurement of the rate variation. The network node may receive, from an Internet Protocol (IP) layer associated with a user plane function (UPF), a measurement of the rate variation. The network node may receive, from an application layer associated with an application server, a measurement of the rate variation. In other words, the network node may determine the rate variation based on the measurement of the rate variation received from the PDCP layer of the CU, the IP layer associated with the UPF, or the application layer associated with the application server. The network node may perform a scheduling for a user equipment (UE) based on the rate variation. The scheduling may be associated with an adjusted data rate based on the rate variation. For example, the scheduling may be associated with a lower data rate when the rate variation exceeds a threshold. As another example, the scheduling may be associated with a higher data rate when the rate variation is less than a threshold.

In some implementations, the rate variation may be measured by the network node, which may function as a scheduler in a radio access network (RAN). The rate variation may be measured in the scheduler as a rate variation though each scheduler per QoS flow. The rate variation may be measured at the PDCP layer through a data session at a certain resolution. The rate variation may be measured at the IP layer or at the application layer. In some implementations, the rate variation may be triggered at a set of thresholds. For example, when the rate variation satisfies a first threshold, the scheduler may perform the scheduling in accordance with a first set of rules. When the rate variation satisfies a second threshold, the scheduler may perform the scheduling in accordance with a second set of rules. In some implementations, the rate variation may be processed together with a variety of reports. For example, the network node may receive a report, where the report may indicate the measurement of the rate variation, along with other information.

In some implementations, by tracking the QoE through the rate variation, the network node may be able to accurately determine the rate variation in the wireless network. The network node may determine the QoE based on the rate variation. For example, a relatively high rate variation may be associated with a poor QoE, whereas a relatively low rate variation may be associated with a favorable QoE. When the rate variation satisfies a threshold, the network node may adjust its scheduling, which may improve the QoE. For example, the network node may adjust the data rate to reduce latency and/or jitter, which may improve the QoE. As a result, by tracking the QoE through the rate variation, the network node may be able to take appropriate actions to improve the QoE.

FIG. 1 is a diagram of an example 100 associated with tracking QoE using rate variation. As shown in FIG. 1, example 100 includes a UE 102, a network node 104, a user plane function (UPF) 106, and a server 108. The network node 104 may be associated with a distributed unit (DU) 110 and a central unit (CU) 112. The network node 104 may be associated with a RAN. The server 108 may be an application server.

As shown by reference number 115, the DU 110 associated with the network node 104 may determine a rate variation associated with a QoS flow and/or a network slice in a wireless network. The rate variation may be a data rate variation. The rate variation may indicate an amount of change in a data rate over a given period of time. For example, the rate variation may be relatively high or relatively low, or the rate variation may be similar to a typical rate variation in the wireless network. An indication of the typical rate variation may be locally stored by the DU 110. The QoS flow may be associated with a QoS flow identifier (QFI), such as a Fifth Generation (5G) QoS identifier (5QI). The QoS flow may be associated with QoS parameters that describe characteristics of a packet flow. Traffic with the same QFI may receive the same forwarding treatment. The network slice may be associated with a single network slice selection assistance information (S-NSSAI), which may uniquely identify the network slice.

In some implementations, the rate variation may be associated with a QoE. The QoE may be a measure of an overall level of customer satisfaction. A relatively high rate variation may degrade an audio/video quality. For example, a user may experience a choppy or broken audio/video stream, which may result in an unfavorable QoE. A relatively low rate variation may result in a favorable audio/video quality. For example, a user may experience a consistent audio/video stream, which may result in a favorable QoE. QoE metrics related to video streaming may be associated with rebuffering, playback failures, and video startup time. In some implementations, by determining the rate variation associated with the QoS flow and/or the network slice, the DU 110 may infer a QoE associated with the QoS flow and/or the network slice. The DU 110 may infer an unfavorable QoE when the rate variation satisfies a threshold (e.g., when the rate variation exceeds the threshold). The DU 110 may infer a favorable QoE when the rate variation satisfies a threshold (e.g., when the rate variation is less than the threshold). Thresholds for inferring the unfavorable QoE from the favorable QoE may be the same threshold or may be different thresholds.

In some implementations, the DU 110 may determine the rate variation associated with the QoS flow and/or the network slice based on a difference between two adjacent rate assignments, a number of rate assignments, and a faded timing factor that provides a weight to a latest rate variation. The rate variation may be defined per QoS flow at a scheduler, associated with the DU 110, in the RAN. The rate variation may be the difference between the two adjacent rate assignments in a relatively fine resolution. The rate variation may be over a period of time on a specific QoS and with the faded timing factor. For example, the rate variation may be calculated in accordance with:

$$RateVaration_j = \sum_{n=1}^{Nrv} \lambda^n (\text{Rate}_j - \text{Rate}_{j-1}).$$

where Nrv is the number of rate assignments, $\text{Rate}_j$ is a rate assignment at time j, and A is the faded timing factor, which may give a relatively high weight for the latest rate variation. In this example, $\text{Rate}_j$ and $\text{Rate}_{j-1}$ may be the two adjacent rate assignments. The two adjacent rate assignments may correspond to a current rate and a previous rate. For the number of rate assignments (Nrv), the DU 110 may determine the difference between each pair of adjacent rate assignments, while accounting for the faded timing factor. The DU 110 may perform a summation of the differences between each pair of adjacent rate assignments in order to calculate the rate variation.

In some implementations, additionally or alternatively, the DU 110 may determine the rate variation associated with the QoS flow and/or the network slice based on one or more measurements of rate variation received from other entities in the wireless network. The DU 110 may measure the rate variation at a radio level. As shown by reference number 120, the DU 110 may receive, from a PDCP layer of the CU 112 associated with the network node 104, a measurement of the rate variation. The rate variation may be associated with a data session. As shown by reference number 125, the DU 110 may receive, from an IP layer associated with the UPF 106, a measurement of the rate variation. As shown by reference number 130, the DU 110 may receive, from an application layer associated with the server 108, a measurement of the rate variation. In other words, the CU 112, the UPF 106, and/or the server 108 may measure the rate variation associated with the QoS flow and/or the network slice. The CU 112, the UPF 106, and/or the server 108 may measure the rate variation at a PDCP level, an IP level, and/or an application level, respectively. The CU 112, the UPF 106, and/or the server 108 may measure the rate variation in accordance with:

$$RateVaration_j = \sum_{n=1}^{Nrv} \lambda^n (\text{Rate}_j - \text{Rate}_{j-1}),$$

and then report the rate variation to the DU 110. The rate variation may be measured at a higher level, as compared to a default level, per QoS flow and per network slice via the PDCP layer at the CU 112, the IP layer at the UPF 106, and/or the application layer at the server 108, which may be in addition to the rate variation measured by the DU 110. The DU 110 may determine the rate variation associated with the QoS flow and/or the network slice based on its own measurements and/or based on the measurements of rate variation received from the other entities in the wireless network.

In some implementations, the DU 110 may receive multiple measurements of rate variation from the other entities in the wireless network. The DU 110 may determine changes in rate variations based on the multiple measurements. The DU 110 may detect network end-to-end break points based on the changes in rate variations. A change of rate variation at various stages may indicate and be used to detect the network end-to-end break points. For example, a relatively good RAN rate variation and a relatively poor IP rate variation may be associated with a transport issue. In some implementations, the DU 110 may determine a first measurement associated with rate variation. The DU 110 may receive a second measurement associated with rate variation from the CU 112, a third measurement associated with rate variation from the UPF 106, and/or a fourth measurement associated with rate variation from the server 108. The DU 110 may detect differences between the first measurement, the second measurement, the third measurement, and/or the fourth measurement, which may enable the DU 110 to identify the network end-to-end break points.

As shown by reference number 135, the DU 110 may perform a scheduling for the UE 102 based on the rate variation. The DU 110 may include a scheduler function that is responsible for performing the scheduling. The scheduling may be associated with an adjusted data rate based on the rate variation. The adjusted data rate may be an absolute data rate. For example, the scheduling may be associated with a lower data rate when the rate variation exceeds a threshold. As another example, the scheduling may be associated with a higher data rate when the rate variation is less than a threshold. In some implementations, the DU 110 may not adjust the data rate when the rate variation does not satisfy a threshold (e.g., the rate variation is less than the threshold). In this case, an amount of rate variation may be relatively small, so the DU 110 may not make any adjustments to the data rate. The rate variation not satisfying the threshold may imply a favorable QoE, so no adjustment to the data rate may be needed. In some implementations, the DU 110 may adjust the data rate when the rate variation satisfies a threshold (e.g., the rate variation is greater than the threshold). In this case, an amount of rate variation may be relatively large, so the DU 110 may make adjustments to the data rate. The rate variation satisfying the threshold may imply an unfavorable QoE, so the adjustment to the data rate may be needed.

In some implementations, the DU 110, based on the rate variation, may adjust the data rate, which may improve latency, jitter, and/or reliability. For example, reducing the data rate may stabilize the rate variation, which may improve latency, jitter, and/or reliability, and thereby the QoE. The lower data rate may lead to increased consistency in terms of the rate variation, which may improve an overall QoE. The adjusted data rate may improve a QoE of a user associated with the UE 102.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
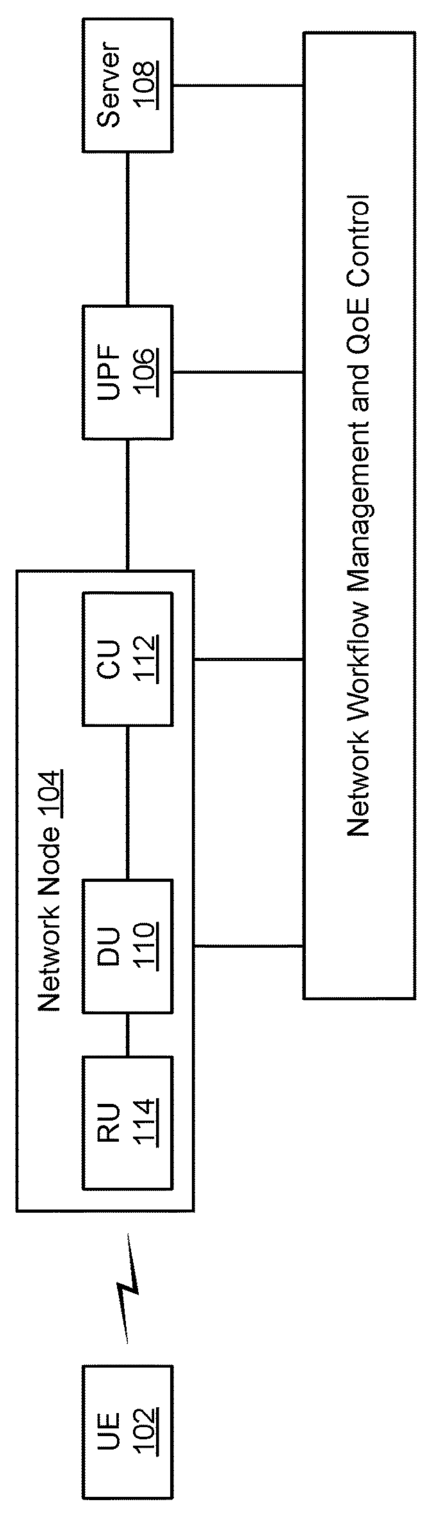
FIG. 2 is a diagram of an example associated with tracking QoE using rate variation.

FIG. 2 is a diagram of an example 200 associated with tracking QoE using rate variation. As shown in FIG. 2, example 200 includes a UE 102, a network node 104, a user plane function (UPF) 106, and a server 108. The network node 104 may be associated with a DU 110, a CU 112, and a radio unit (RU) 114. The server 108 may be an application server.

As shown in FIG. 2, the DU 110, the CU 112, the UPF 106, and the server 108 may be associated with a network workflow management and a QoE control. The DU 110 may determine a rate variation associated with the QoS flow and/or the network slice. Additionally, or alternatively, the CU 112, the UPF 106, and/or the server 108 may determine the rate variation associated with the QoS flow and/or the network slice. In other words, the CU 112, the UPF 106, and/or the server 108 may measure the rate variation at a higher level per QoS flow and per network slice. The CU 112, the UPF 106, and/or the server 108 may report measurements associated with rate variation to the DU 110. The CU 112, the UPF 106, and/or the server 108 may transmit a dedicated report for the measurements associated with rate variation, or the CU 112, the UPF 106, and/or the server 108 may indicate the measurements associated with rate variation in another report. The rate variation may not necessarily be determined for every QoS flow and/or every network slice, but rather may be determined only for specific QoS flows and/or specific network slices, depending on a configuration of the DU 110. For example, the DU 110 may be configured to measure the rate variation for only specific QoS flows and/or network slices. The DU 110 may perform a scheduling for the UE 102 based on the rate variation. The DU 110 may transmit, via the RU 114, data in accordance with an adjusted data rate, where the adjusted data rate may be based on the rate variation. The adjusted data rate may reduce latency and/or jitter, thereby improving a QoE for a user associated with the UE 102.

In some implementations, by measuring the data variation at the DU 110, the CU 112, the UPF 106, and/or the server 108, and by aggregating measurements of data variation from the DU 110, the CU 112, the UPF 106, and/or the server 108, the DU 110 may be able to accurately determine the data variation on a per QoS basis and/or on a per network slice basis. The data variation may be indicative of latency (e.g., uplink latency) and/or reliability, which may affect the QoE. By tracking the QoE through data variation, the DU may perform actions (e.g., scheduling) to improve latency and/or reliability, thereby improving the QoE.

As indicated above, FIG. 2 is provided as an example. Other examples may differ from what is described with regard to FIG. 2.

Figure 3:
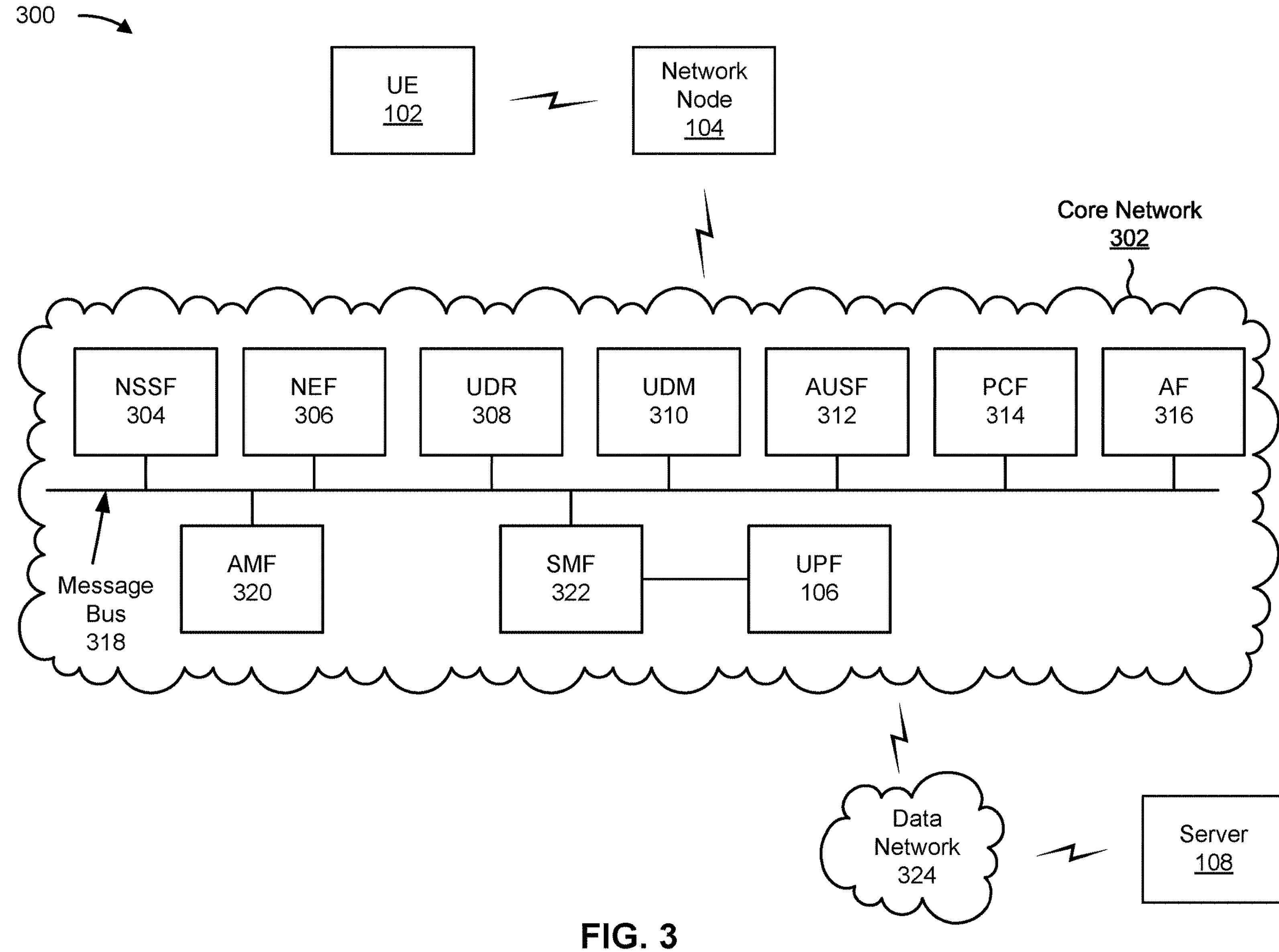
FIG. 3 is a diagram of an example environment in which systems and/or methods described herein may be implemented.

FIG. 3 is a diagram of an example environment 300 in which systems and/or methods described herein may be implemented. As shown in FIG. 3, example environment 300 may include a UE 102, a network node 104 in a RAN, a core network 302, a data network 324, and/or a server 108. Devices and/or networks of example environment 300 may interconnect via wired connections, wireless connections, or a combination of wired and wireless connections.

The UE 102 may include one or more devices capable of receiving, generating, storing, processing, and/or providing information, such as information described herein. For example, the UE 102 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The network node 104 may include one or more devices capable of receiving, processing, storing, routing, and/or providing information, such as information described herein. The network node 104 may be configured to communicate, directly or indirectly, with the UE 102. The network node 104 may be an aggregated network node, meaning that the aggregated network node is configured to utilize a radio protocol stack that is physically or logically integrated within a single RAN node (e.g., within a single device or unit). The network node 104 may be a disaggregated network node (sometimes referred to as a disaggregated base station), meaning that the network node 104 is configured to utilize a protocol stack that is physically or logically distributed among two or more nodes (such as one or more CUs, one or more DUs, or one or more RUs). The network node 104 may include, for example, a New Radio (NR) base station, a Long Term Evolution (LTE) base station, a Node B, an eNB (e.g., in 4G), a gNB (e.g., in 5G), an access point, a transmission reception point (TRP), a DU, an RU, a CU, a mobility element of a network, a core network node, a network element, a network equipment, and/or a RAN node.

The RAN may support, for example, a cellular radio access technology (RAT). The RAN may include the network node 104 (e.g., a base transceiver station, radio base station, node B, eNodeB (eNB), gNodeB (gNB), base station subsystem, cellular site, cellular tower, access point, TRP, radio access node, macrocell base station, microcell base station, picocell base station, femtocell base station, or similar type of device). The RAN may transfer traffic between the UE (e.g., using a cellular RAT), the network node 104 (e.g., using a wireless interface or a backhaul interface, such as a wired backhaul interface), and/or the core network 302. The RAN may provide one or more cells that cover geographic areas.

The RAN may perform scheduling and/or resource management for the UE 102 covered by the RAN (e.g., the UE 102 covered by a cell provided by the RAN). In some implementations, the RAN may be controlled or coordinated by a network controller, which may perform load balancing, network-level configuration, and/or other operations. The network controller may communicate with the RAN via a wireless or wireline backhaul. In some implementations, the RAN may include a network controller, a self-organizing network (SON) module or component, or a similar module or component. In other words, the RAN may perform network control, scheduling, and/or network management functions (e.g., for uplink, downlink, and/or sidelink communications of the UE 102 covered by the RAN).

The core network 302 may include an example functional architecture in which systems and/or methods described herein may be implemented. For example, the core network 302 may include an example architecture of a fifth generation (5G) next generation (NG) core network included in a 5G wireless telecommunications system. While the example architecture of the core network 302 shown in FIG. 3 may be an example of a service-based architecture, in some implementations, the core network 302 may be implemented as a reference-point architecture and/or a 4G core network, among other examples.

The core network 302 include a number of functional elements. The functional elements may include, for example, a network slice selection function (NSSF) 304, a network exposure function (NEF) 306, a unified data repository (UDR) 308, a unified data management (UDM) 310, an authentication server function (AUSF) 312, a policy control function (PCF) 314, an application function (AF) 316, an access and mobility management function (AMF) 320, a session management function (SMF) 322, and/or a UPF 106. These functional elements may be communicatively connected via a message bus 318. Each of the functional elements shown in FIG. 3 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 304 may include one or more devices that select network slice instances for the UE 102. By providing network slicing, the NSSF 304 may allow an operator to deploy multiple substantially independent end-to-end networks potentially with the same infrastructure. In some implementations, each slice may be customized for different services. The NSSF 304 may include one or more devices that support exposure of capabilities and/or events in the wireless telecommunications system to help other entities in the wireless telecommunications system discover network services.

The UDR 308 may include one or more devices that provide a converged repository, which may be used by network functions to store data. For example, a converged repository of subscriber information may be used to service a number of network functions. The UDM 310 may include one or more devices to store user data and profiles in the wireless telecommunications system. The UDM 310 may generate AKA authentication vectors, perform user identification handling, perform subscription management, and perform other various functions. The UDM 310 may be used for fixed access and/or mobile access in the core network 302. The AUSF 312 may include one or more devices that act as an authentication server and support the process of authenticating the UE 102 in the wireless telecommunications system.

The PCF 314 may include one or more devices that provide a policy framework that incorporates network slicing, roaming, packet processing, and/or mobility management, among other examples. The AF 316 may include one or more devices that support application influence on traffic routing, access to the NEF 306, and/or policy control, among other examples. The AMF 320 may include one or more devices that act as a termination point for non-access stratum (NAS) signaling and/or mobility management, among other examples. The SMF 322 may include one or more devices that support the establishment, modification, and release of communication sessions in the wireless telecommunications system. For example, the SMF 322 may configure traffic steering policies at the UPF 106 and/or may enforce UE IP address allocation and policies, among other examples. The UPF 106 may include one or more devices that serve as an anchor point for intra-RAT and/or inter-RAT mobility. The UPF 106 may apply rules to packets, such as rules pertaining to packet routing, traffic reporting, and/or handling user plane quality of service (QoS), among other examples. The message bus 318 may represent a communication structure for communication among the functional elements. In other words, the message bus 318 may permit communication between two or more functional elements.

The data network 324 may include one or more wired and/or wireless data networks. For example, the data network 324 may include an IP multimedia subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The server 108 may include one or more devices capable of receiving, generating, storing, processing, providing, and/or routing information, such as information described herein. The server 108 may include a communication device and/or a computing device. For example, the server 108 may include a server, such as an application server, a client server, a web server, a database server, a host server, a proxy server, a virtual server (e.g., executing on computing hardware), or a server in a cloud computing system. In some implementations, the server 108 may include computing hardware used in a cloud computing environment.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example environment 300 may perform one or more functions described as being performed by another set of devices of example environment 300.

Figure 4:
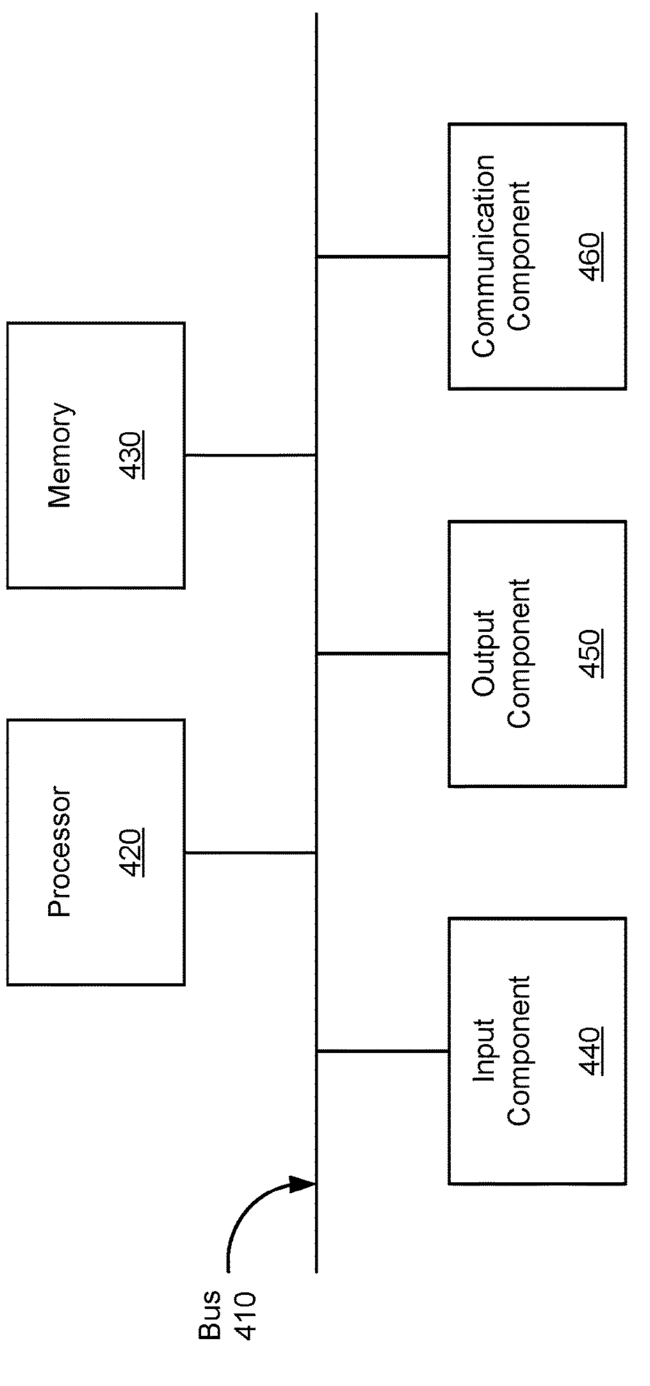
FIG. 4 is a diagram of example components of one or more devices of FIG. 3.

FIG. 4 is a diagram of example components of a device 400 associated with tracking QoE using rate variation. The device 400 may correspond to a network node (e.g., network node 104). In some implementations, the network node may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
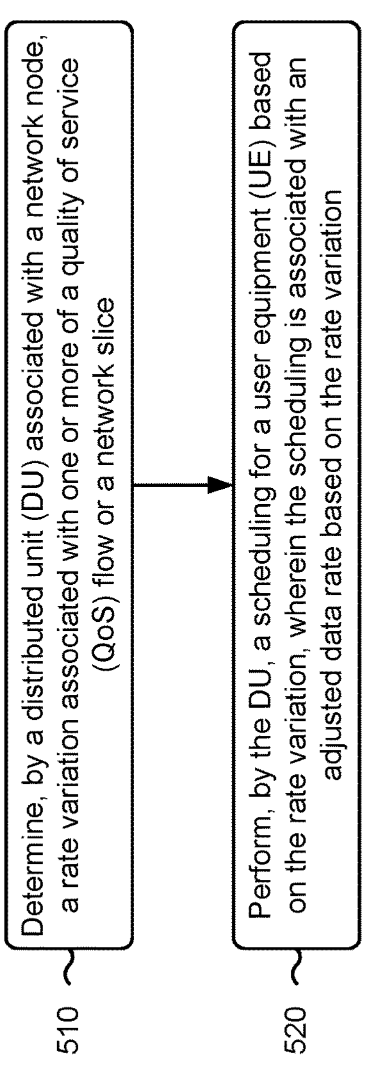
FIG. 5 is a flowchart of an example process associated with tracking QoE using rate variation.

FIG. 5 is a flowchart of an example process 500 associated with tracking QoE using rate variation. In some implementations, one or more process blocks of FIG. 5 may be performed by a network node (e.g., network node 104). In some implementations, one or more process blocks of FIG. 5 may be performed by another device or a group of devices separate from or including the network node, such as a UPF (e.g., UPF 106) or a server (e.g., server 108). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include determining, by a DU associated with a network node, a rate variation associated with one or more of a QoS flow or a network slice (block 510). The rate variation may be associated with a QoE. The rate variation may be based on a difference between two adjacent rate assignments, a number of rate assignments, and a faded timing factor that provides a weight to a latest rate variation. The DU may determine the rate variation based on a measurement of the rate variation, as received from a PDCP layer of a CU associated with the network node, where the rate variation may be associated with a data session. The DU may determine the rate variation based on a measurement of the rate variation, as received from an IP layer associated with a UPF. The DU may determine the rate variation based on a measurement of the rate variation, as received from an application layer associated with an application server.

As shown in FIG. 5, process 500 may include performing, by the DU, a scheduling for a UE based on the rate variation (block 520). The scheduling may be associated with an adjusted data rate based on the rate variation. For example, the scheduling may be associated with a lower data rate when the rate variation exceeds a threshold. As another example, the scheduling may be associated with a higher data rate when the rate variation is less than a threshold.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

determining, by a distributed unit (DU) associated with a network node, a rate variation associated with one or more of a quality of service (QoS) flow or a network slice, wherein determining the rate variation comprises:

determining, for a number of rate assignments and using a faded timing factor, differences between pairs of adjacent rate assignments, wherein the faded timing factor provides a weight to a latest difference of the differences; and performing, by the DU, a scheduling for a user equipment (UE) based on the rate variation, wherein the scheduling is associated with an adjusted data rate based on the rate variation, wherein the scheduling is performed in accordance with a first set of rules when the rate variation satisfies a first threshold, and wherein the scheduling is performed in accordance with a second set of rules when the rate variation satisfies a second threshold.

2. The method of claim 1, wherein the rate variation is associated with a quality of experience (QoE).

3. The method of claim 1, wherein the rate variation is determined over a period of time and on a specific QoS.

4. The method of claim 1, further comprising:

receiving, by the DU and from a packet data convergence protocol (PDCP) layer of a centralized unit (CU) associated with the network node, a measurement of the rate variation, wherein the rate variation is associated with a data session.

5. The method of claim 1, further comprising:

receiving, by the DU and from an Internet Protocol (IP) layer associated with a user plane function (UPF), a measurement of the rate variation.

6. The method of claim 1, further comprising:

receiving, by the DU and from an application layer associated with an application server, a measurement of the rate variation.

7. The method of claim 1, further comprising:

receiving, by the DU, multiple measurements associated with the rate variation;

determining, by the DU, changes in rate variations based on the multiple measurements; and detecting, by the DU, network end-to-end break points based on the changes in rate variations.

8. A device, comprising:

one or more processors configured to:

determine a rate variation associated with one or more of a quality of service (QoS) flow or a network slice, wherein determining the rate variation comprises:

determining, for a number of rate assignments and using a faded timing factor, differences between pairs of adjacent rate assignments, wherein the faded timing factor provides a weight to a latest difference of the differences; and perform a scheduling for a user equipment (UE) based on the rate variation, wherein the scheduling is associated with an adjusted data rate based on the rate variation, wherein the scheduling is performed in accordance with a first set of rules when the rate variation satisfies a first threshold, and wherein the scheduling is performed in accordance with a second set of rules when the rate variation satisfies a second threshold.

9. The device of claim 8, wherein the rate variation is associated with a quality of experience (QoE).

10. The device of claim 8, wherein the rate variation is determined over a period of time and on a specific QoS.

11. The device of claim 8, wherein the one or more processors are further configured to:

receive, from a packet data convergence protocol (PDCP) layer of a centralized unit (CU) associated with a network node, a measurement of the rate variation, wherein the rate variation is associated with a data session.

12. The device of claim 8, wherein the one or more processors are further configured to:

receive, from an Internet Protocol (IP) layer associated with a user plane function (UPF), a measurement of the rate variation.

13. The device of claim 8, wherein the one or more processors are further configured to:

receive, from an application layer associated with an application server, a measurement of the rate variation.

14. The device of claim 8, wherein the one or more processors are further configured to:

receive multiple measurements associated with the rate variation;

determine changes in rate variations based on the multiple measurements; and detect network end-to-end break points based on the changes in rate variations.

15. A non-transitory computer-readable medium storing a set of instructions, the set of instructions comprising:

one or more instructions that, when executed by one or more processors of a device, cause the device to:

determine a rate variation associated with one or more of a quality of service (QoS) flow or a network slice, wherein the rate variation is associated with a quality of experience (QoE), wherein determining the rate variation comprises:

determining, for a number of rate assignments and using a faded timing factor, differences between pairs of adjacent rate assignments, wherein the faded timing factor provides a weight to a latest difference of the differences; and perform a scheduling for a user equipment (UE) based on the rate variation, wherein the scheduling is associated with an adjusted data rate based on the rate variation, wherein the scheduling is performed in accordance with a first set of rules when the rate variation satisfies a first threshold, and wherein the scheduling is performed in accordance with a second set of rules when the rate variation satisfies a second threshold.

16. The non-transitory computer-readable medium of claim 15, wherein the rate variation is determined over a period of time and on a specific QoS.

17. The non-transitory computer-readable medium of claim 15, wherein the one or more instructions, when executed by the one or more processors, further cause the device to:

receive, from a packet data convergence protocol (PDCP) layer of a centralized unit (CU) associated with a network node, a measurement of the rate variation, wherein the rate variation is associated with a data session.

18. The non-transitory computer-readable medium of claim 15, wherein the one or more instructions, when executed by the one or more processors, further cause the device to:

receive, from an Internet Protocol (IP) layer associated with a user plane function (UPF), a measurement of the rate variation.

19. The non-transitory computer-readable medium of claim 15, wherein the one or more instructions, when executed by the one or more processors, further cause the device to:

receive, from an application layer associated with an application server, a measurement of the rate variation.

20. The non-transitory computer-readable medium of claim 15, wherein the one or more instructions, when executed by the one or more processors, further cause the device to:

receive multiple measurements associated with the rate variation;

determine changes in rate variations based on the multiple measurements; and detect network end-to-end break points based on the changes in rate variations.

* * * * *